United States Patent
Shiomi et al.

(10) Patent No.: US 9,026,246 B2
(45) Date of Patent: May 5, 2015

(54) MEDIUM PROCESSING DEVICE AND MEDIUM PROCESSING METHOD

(75) Inventors: Toshirou Shiomi, Nagano (JP); Tsutomu Baba, Nagano (JP); Keiji Hoson, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 13/264,636

(22) PCT Filed: Jul. 12, 2010

(86) PCT No.: PCT/JP2010/061750
§ 371 (c)(1),
(2), (4) Date: Oct. 14, 2011

(87) PCT Pub. No.: WO2011/007748
PCT Pub. Date: Jan. 20, 2011

(65) Prior Publication Data
US 2012/0109373 A1    May 3, 2012

(30) Foreign Application Priority Data
Jul. 13, 2009    (JP) ................. 2009-164992

(51) Int. Cl.
*G05B 15/00*    (2006.01)
*G06K 13/08*    (2006.01)
*G06K 17/00*    (2006.01)
*G07F 7/08*    (2006.01)
(Continued)

(52) U.S. Cl.
CPC .......... *G06K 13/0843* (2013.01); *G06K 7/0095* (2013.01); *G06K 13/085* (2013.01); *G06K 17/00* (2013.01); *G07F 7/0873* (2013.01); *G07F 19/20* (2013.01); *G07F 19/205* (2013.01)

(58) Field of Classification Search
CPC    G06K 7/0095; G06K 13/085; G06K 13/0843
USPC ......................................... 700/240, 236–237
See application file for complete search history.

(56) References Cited

U.S. PATENT DOCUMENTS 5,175,418 A *  12/1992   Tanaka ........................... 235/439
5,606,158 A *  2/1997   Takemoto et al. ............ 235/380
(Continued)

FOREIGN PATENT DOCUMENTS

EP         1630724 A1    3/2006
EP         2075771 A2    7/2009
(Continued)

OTHER PUBLICATIONS

International Search Report for International application No. PCT/JP2010/061750 mailing date of Sep. 7, 2010.

*Primary Examiner* — Michael K Collins
(74) *Attorney, Agent, or Firm* — Cantor Colburn LLP

(57) ABSTRACT

A media processing device, controls such that when a medium is transported in the inserting direction by means of transporting means, the media information recorded on the medium is read by a media information read means and stored by recording to memory. Whether or not the medium is ejectable is determined by transporting the medium in the ejecting direction by means of the transporting means. The media information stored in memory is controlled so as to be deleted when it is determined that the medium is not ejectable. In this way, as long as it is not confirmed that the medium is ejectable, the media information recorded in the medium is not output to the host device.

9 Claims, 6 Drawing Sheets

(51) Int. Cl.
*G07F 19/00* (2006.01)
*G06K 7/00* (2006.01)

(56) References Cited

U.S. PATENT DOCUMENTS

| | | | | |
|---|---|---|---|---|
| 5,917,177 | A * | 6/1999 | Owa et al. | 235/486 |
| 6,000,607 | A * | 12/1999 | Ohki et al. | 235/379 |
| 6,216,954 | B1 * | 4/2001 | Kuwamoto et al. | 235/486 |
| 6,349,878 | B2 * | 2/2002 | Imai | 235/440 |
| 6,381,513 | B1 * | 4/2002 | Takase et al. | 700/231 |
| 6,529,453 | B1 * | 3/2003 | Otsuka et al. | 369/30.32 |
| 6,981,641 | B2 * | 1/2006 | Abe et al. | 235/441 |
| 7,347,377 | B2 * | 3/2008 | Kitazawa | 235/475 |
| 7,607,580 | B2 * | 10/2009 | Takita et al. | 235/451 |
| 8,091,213 | B2 * | 1/2012 | Yuyama et al. | 29/701 |
| 8,167,211 | B2 * | 5/2012 | Tatai et al. | 235/486 |
| 8,251,282 | B2 * | 8/2012 | Clark et al. | 235/380 |
| 8,255,080 | B2 * | 8/2012 | Hirsh et al. | 700/242 |
| 8,511,556 | B2 * | 8/2013 | Takeuchi | 235/437 |
| 2001/0052546 | A1 | 12/2001 | Imai | |
| 2005/0218227 | A1 * | 10/2005 | Takita et al. | 235/441 |
| 2007/0125845 | A1 * | 6/2007 | Martin et al. | 235/381 |
| 2008/0004748 | A1 * | 1/2008 | Butler et al. | 700/244 |
| 2009/0159687 | A1 | 6/2009 | Clark et al. | |
| 2009/0266894 | A1 * | 10/2009 | Yamanaka et al. | 235/449 |

FOREIGN PATENT DOCUMENTS

| | | |
|---|---|---|
| JP | 11-203416 A | 7/1999 |
| JP | 2005-284483 A | 10/2005 |
| JP | 2006-155567 A | 6/2006 |
| JP | 2009-151762 A | 7/2009 |
| WO | 2004104909 A1 | 5/2004 |

\* cited by examiner

Measure Output Time of Magnetic Signal after Card Sensor is light-shielded

Output Time of Magnetic Information is shortened when Card Ejection is hindered by Trick Abnormality is detected because
Signal Period is varied
when Card Ejection is hindered by Trick

MEDIUM PROCESSING DEVICE AND MEDIUM PROCESSING METHOD

CROSS REFERENCE TO RELATED APPLICATIONS

This is a U.S. national stage of application No. PCT/JP2010/061750, filed on Jul. 12, 2010. Priority under 35 U.S.C. §119(a) and 35 U.S.C. §365(b) is claimed from Japanese Application No. 2009-164992, filed Jul. 13, 2009, the disclosure of which is also incorporated herein by reference.

TECHNICAL FIELD

The present invention relates to a medium processing device for reading or writing of medium information from or in a medium in which information is recorded, and relates to a medium processing method which is applied to the medium processing device.

BACKGROUND

For example, as a medium processing device for reading or writing of medium information from or in a medium in which information is recorded, a card reader has been known in which medium information in a card-shaped medium provided with an information recording part (information recording means) such as a magnetic stripe or an IC chip is read from or written in the card-shaped medium. The card reader is generally mounted on an apparatus or an equipment such as an ATM device (automated teller machine) or a CD machine (cash dispenser).

In recent years, the number of crimes that a third person other than an owner of a card-shaped medium steals the card-shaped medium has been rapidly increased. The third person reads personal identification information recorded in the stolen card-shaped medium to use illegally for performing personal identification or the third person forges a card-shaped medium or the like to illegally use the medium, which has become a major social problem.

Conventionally, a card reader (hereinafter, referred to as a prior art 1) has been proposed which is provided with a card locking device having a pull-out prevention lock mechanism for preventing illegal use of a card-shaped medium by a criminal (see, for example, Patent Literature 1).

In the prior art 1, even when a criminal hinders ejection of a card-shaped medium by a trick which is secretly attached to a card reader and, even when the criminal tries to pull out the card-shaped medium while a user has been left, the pull-out prevention lock mechanism is operated so that a lock tooth bites into the card-shaped medium to lock the card-shaped medium at the position. In this manner, since the card-shaped medium located in the inside of the card reader is locked so as not to be moved, the card-shaped medium is prevented from being illegally pulled out by a criminal. As a result, an illegal use of a card-shaped medium by a criminal is prevented from occurring in advance.

CITATION LIST

Patent Literature

[PTL 1] Japanese Patent Laid-Open No. 2006-155567
However, there is the following problem in the prior art 1.
First, the pull-out prevention lock mechanism provides an effect of surely restraining an illegal pulling-out operation of a card-shaped medium. However, the card-shaped medium is damaged by the lock tooth and thus reissue of a card-shaped medium is required.

Second, the card reader is provided with the card locking device having the pull-out prevention lock mechanism. Therefore, the number of part items of the card reader is inevitably increased and its size is increased and, in addition, its structure becomes complicated and thus a manufacturing cost of the card reader is remarkably increased.

In view of the problems described above, at least an embodiment of the present invention provides a medium processing device and a medium processing method which are capable of preventing an illegal use of a medium by a criminal without damaging the medium.

SUMMARY

In order to solve the problem, at least an embodiment of the present invention provides a medium processing device including a carrying mechanism for carrying a medium in an inserting direction and an ejecting direction, a medium information reading part for reading medium information which is recorded in the medium, a memory for storing the medium information which is read by the medium information reading part, and a control section for controlling the carrying mechanism, the medium information reading part and the memory. The control section includes a medium information reading control section which controls so that, when the medium is carried in the inserting direction by the carrying mechanism, the medium information that is recorded in the medium is read by the medium information reading part to store and hold in the memory, an ejection capability determining section which determines whether or not the medium is capable of being ejected by carrying the medium in the ejecting direction by the carrying mechanism, and a medium information discard control section which controls so that, when the ejection capability determining section determines that the medium is unable to be ejected, the medium information which is held in the memory is discarded.

Further, in at least an embodiment the control section controls so that, after the ejection capability determining section has determined whether the medium is capable of being ejected or not, the medium is carried in the inserting direction by the carrying mechanism.

Further, in at least an embodiment the control section controls so that, when the ejection capability determining section has determined that the medium is capable of being ejected, the medium information which has been held in the memory is outputted to a host device.

Further, in at least an embodiment the control section determines whether the medium is capable of being ejected or not on the basis of a medium information reading signal which is outputted from the medium.

Further, in at least an embodiment the control section determines whether the medium is capable of being ejected or not on the basis of a driving condition of the carrying mechanism.

In addition, at least an embodiment provides a medium processing method which is applied to a medium processing device having a carrying mechanism for carrying a medium in an inserting direction and an ejecting direction, a medium information reading part for reading medium information which is recorded in the medium, and a memory for storing the medium information which is read by the medium information reading part. The medium processing method includes a medium information reading control step which is controlled so that, when the medium is carried in the inserting direction by the carrying mechanism, medium information recorded in the medium is read by the medium information reading part and is stored and held in the memory, an ejection capability determining step which determines whether the medium is capable of being ejected or not by carrying the medium in the ejecting direction by the carrying mechanism, a medium information discard step which is controlled so that, when the ejection capability determining step has determined that the medium is unable to be ejected, the medium information which has been held in the memory is discarded, and a medium information outputting step which is controlled so that, when the ejection capability determining step has determined that the medium is capable of being ejected, the medium information which has been held in the memory is outputted to a host device.

In the medium processing device and the medium processing method according to at least an embodiment of the present invention, illegal use of a medium by a criminal can be prevented without damaging the medium. In addition, even at an abnormal time (ejection of a medium is hindered), the medium is not damaged and thus a reissue cost of the medium is reduced.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which: [FIG. 1]

FIG. 1(a) is a cross-sectional view showing the card reader and FIG. 1(b) is a control block diagram showing internal functions of the card reader.

FIG. 2 is a block diagram showing a using state of the card reader in accordance with the first embodiment.

FIG. 3 is a flow chart showing a card processing program which is incorporated as a firmware into the card reader in accordance with the first embodiment.

FIG. 4 is a cross-sectional view showing a state where a card has been inserted into an insertion port of the card reader in accordance with the first embodiment.

FIG. 5 is a cross-sectional view showing a state where a card has been taken into the card reader in accordance with the first embodiment.

FIG. 6 is a cross-sectional view showing a state where a card having been taken into the card reader is ejected a little in accordance with the first embodiment.

FIG. 7 is a cross-sectional view showing a state where ejection of a card having taken into the card reader is hindered in accordance with the first embodiment.

FIG. 8 is a time chart showing an output condition of a magnetic information reading signal at a normal time (when card ejection is not hindered) in the card reader in accordance with the first embodiment.

FIG. 9 is a time chart showing an output condition of a magnetic information reading signal at an abnormal time (when card ejection is hindered) in the card reader in accordance with the first embodiment.

FIG. 10 is a time chart showing an output condition of an output signal of a motor encoder at an abnormal time (when card ejection is hindered) in a card reader in accordance with a second embodiment of the present invention.

DESCRIPTION OF EMBODIMENTS

Figure 1A:
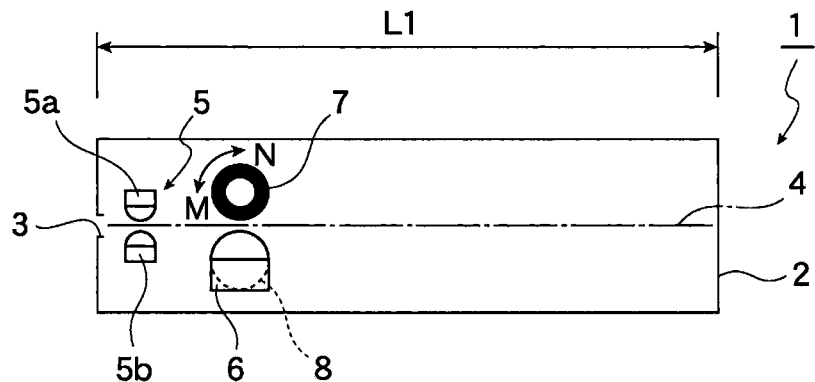
FIGS. 1(a) and 1(b) are views showing a card reader in accordance with a first embodiment of the present invention.

Embodiments of the present invention will be described below.

[First Embodiment of the Present Invention]

A first embodiment of the present invention is shown in FIGS. 1(a) through 9. In the first embodiment, since a card 21 is used as a medium, a card reader 1 is used as a medium processing device, a pair of a carrying roller 7 and a pressing roller 8 is used as a carrying mechanism, and a CPU 11 is used as a control section. Further, the card 21 is provided with a magnetic stripe in which magnetic information as medium information is recorded, and a magnetic head 6 is used as an information reading part for reading the magnetic information.

In at least an embodiment of the present invention, although a reading operation of the magnetic information is executed when a card 21 is taken into the inside of the card reader 1, the magnetic information is temporarily held in a memory 18 which is provided in the card reader 1 without outputting to a host device 23. After that, when it is determined that ejection of the card 21 is unable to be executed (abnormal state such as a jam error), the magnetic information is discarded. Next, a specific embodiment will be described below.

First, the structure of the card reader 1 will be described below.

A small card reader 1 in accordance with the first embodiment 1 is, as shown in FIG. 1(a), provided with a casing 2 in a rectangular prism shape having a size capable of completely taking a card into its inside. A length "L1" of the casing 2 is a little longer than a card length of the card 21 (see FIG. 5). An insertion port 3 is formed in a front face of the casing 2 (left side face in FIG. 1(a)) and a carrying passage 4 is formed horizontally so as to reach from the insertion port 3 to the vicinity of a rear face of the casing 2 (right side face in FIG. 1(a)).

An optical type card sensor 5 is disposed in the inside of the casing 2 in the vicinity of the insertion port 3. The card sensor 5 is structured of a light emitting element 5a such as a light emitting diode and a light receiving element 5b such as a photo sensor. The light emitting element 5a and the light receiving element 5b are oppositely disposed to each other so as to interpose the carrying passage 4. Further, a magnetic head 6 is disposed slightly behind the card sensor 5 (right side in FIG. 1(a)) and on a lower side in the inside of the casing 2. More specifically, the magnetic head 6 is disposed at a position through which a magnetic stripe formed on a card 21 to be carried is passed.

In addition, a pad roller not shown is disposed on an upper side of the carrying passage 4 so as to face the magnetic head 6 and a carried card 21 is sandwiched by the magnetic head 6 and the pad roller. More specifically, one of the pad roller and the magnetic head 6 is urged by a spring not shown to the other side so that the carried card 21 is sandwiched by the magnetic head 6 and the pad roller with a predetermined pressing force.

In addition, in this embodiment, a carrying roller 7 is disposed in the vicinity of the magnetic head 6 and a card 21 which is inserted into the carrying passage 4 from the insertion port 3 is carried by the carrying roller 7. In other words, the carrying roller 7 is disposed at a position adjacent to the magnetic head 6 in a widthwise direction of the carrying passage 4 and at a roughly center position in the widthwise direction of the carrying passage 4. A pressing roller 8 is provided at a position so as to face the carrying roller 7. The pressing roller 8 is disposed so that its axial center is substantially parallel to an axial center of the carrying roller 7 and an outer peripheral face of the pressing roller 8 faces an outer peripheral face of the carrying roller 7. Therefore, a card 21 which is inserted from the insertion port 3 into the carrying passage 4 is sandwiched by a pair of the carrying roller 7 and the pressing roller 8.

Figure 1B:
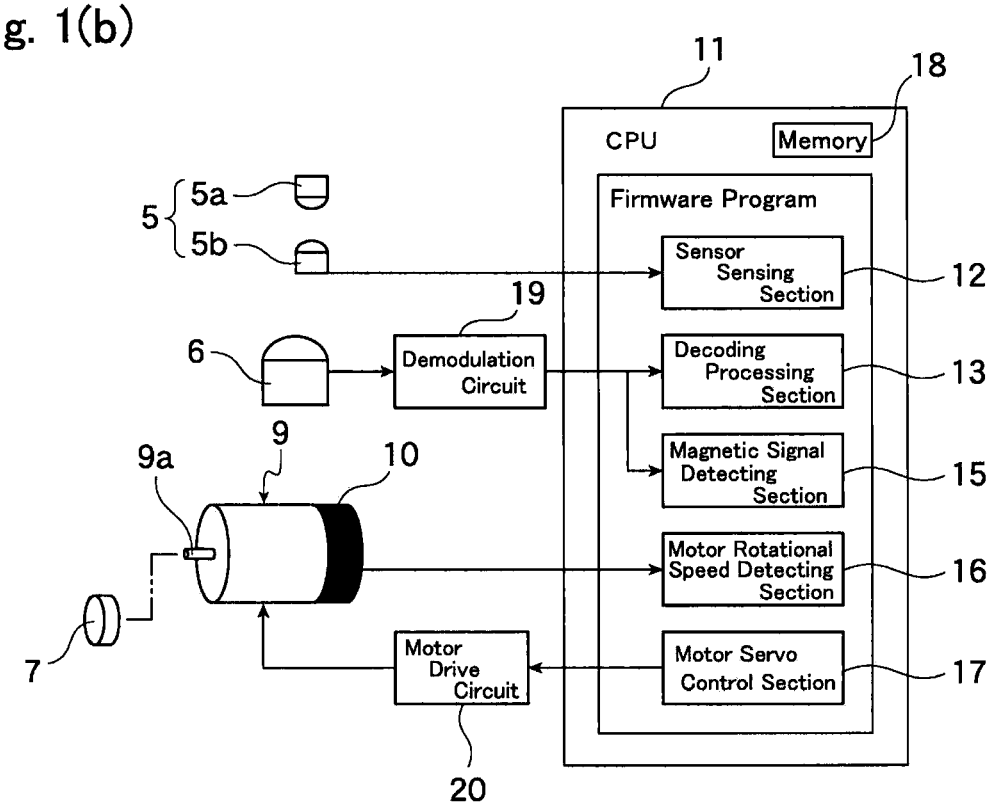

The carrying roller 7 is, as shown in FIG. 1(*a*), arranged so as to be capable of rotating in both directions shown by the arrows "M" and "N". In other words, the carrying roller 7 is connected with an output shaft 9*a* of a motor 9 through a gear train or a belt not shown and the carrying roller 7 receives a drive force of the motor 9 to be rotated. According to the structure as described above, when the output shaft 9*a* is rotated in a normal direction or a reverse direction by supplying an electric current to the motor 9, the carrying roller 7 is rotated in an inserting direction (arrow "M" direction in FIG. 1(*a*)) in which a card is inserted, or in an ejecting direction (arrow "N" direction in FIG. 1(*a*)) in which a card is ejected. Further, an encoder 10 is attached to the motor 9 so that a signal having a frequency in proportion to a rotational speed of the output shaft 9*a* is capable of being outputted as an encoder signal.

The card reader 1 is provided with a CPU (central processing unit) 11 as shown in FIG. 1(*b*). The CPU 11 is provided with a sensor sensing section 12, a decoding processing section 13, a magnetic signal detecting section 15, a motor rotational speed detecting section 16, a motor servo control section 17 and a memory 18. In this embodiment, the sensor sensing section 12 is connected with the light receiving element 5*b* of the card sensor 5. The decoding processing section 13 and the magnetic signal detecting section 15 are connected with the magnetic head 6 through a demodulation circuit 19. The motor rotational speed detecting section 16 is connected with the encoder 10. The motor servo control section 17 is connected with the motor 9 through a motor drive circuit 20.

Further, the CPU 11 as a control section is, in addition to the sensor sensing section 12, the decoding processing section 13, the magnetic signal detecting section 15, the motor rotational speed detecting section 16, the motor servo control section 17 and the memory 18, provided with, although not shown, a medium information reading control section, an ejection capability determining section and a medium information discard control section. In this embodiment, the medium information reading control section is provided with a function for controlling so that magnetic information (medium information) recorded in a card 21 is read by the magnetic head 6 when the card 21 is carried by a pair of the carrying roller 7 and the pressing roller 8 in the inserting direction (arrow "M" direction in FIG. 1(*a*)) and is stored and held in the memory 18. Further, the ejection capability determining section is provided with a function for determining whether the card 21 is capable of being ejected or not by carrying the card 21 in the ejecting direction (arrow "N" direction in FIG. 1(*a*)) by a pair of the carrying roller 7 and the pressing roller 8. In addition, the medium information discard control section is provided with a function for controlling so as to discard magnetic information (medium information) held by the memory 18 when the ejection capability determining section determines that the card 21 is unable to be ejected.

Figure 2:
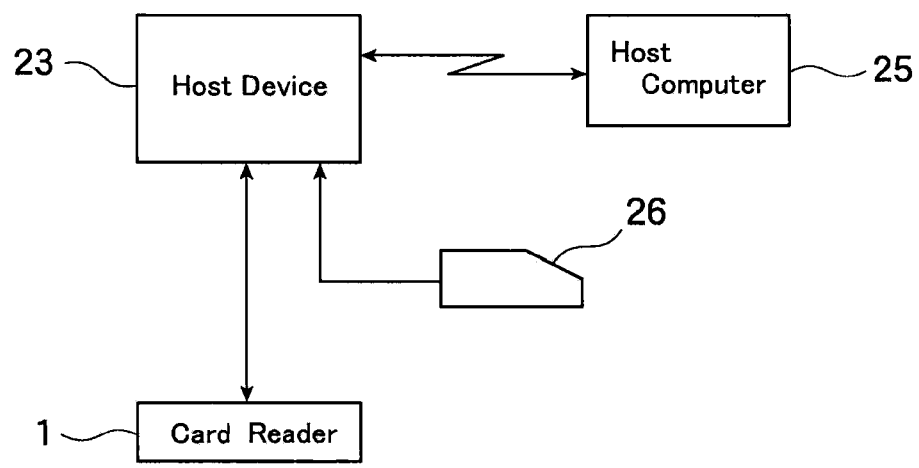
[FIG. 2]
Figure 3:
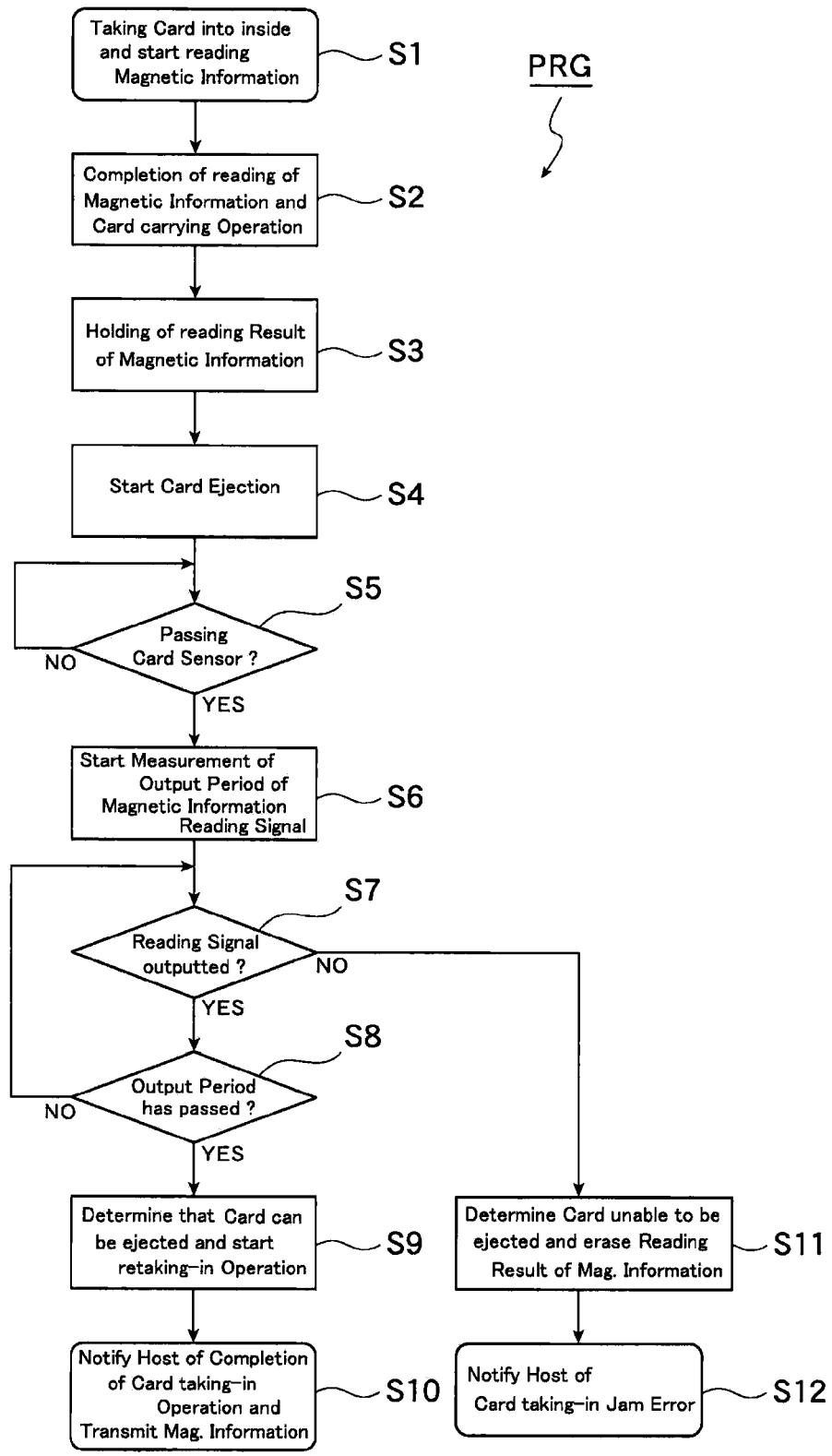
[FIG. 3]

When the card reader 1 is to be used, as shown in FIG. 2, the card reader 1 is connected to a host device 23 (for example, personal computer) through a cable. The host device 23 is connected with a personal identification number input device 26 such as a keypad through a cable and is online-connected through a communication line with a host computer 25 which is installed in a center of a financial institution.

Next, a reading operation for a card 21 in the card reader 1 having a structure as described above will be described below. The reading operation is executed by the CPU 11 based on a card processing program "PRG" shown in FIG. 3 in such a manner that the sensor sensing section 12, the decoding processing section 13, the magnetic signal detecting section 15, the motor rotational speed detecting section 16 and the motor servo control section 17 shown in FIG. 1(*b*) and, in addition, the medium information reading control section, the ejection capability determining section and the medium information discard control section in the CPU 11 are controlled appropriately.

Figure 4:
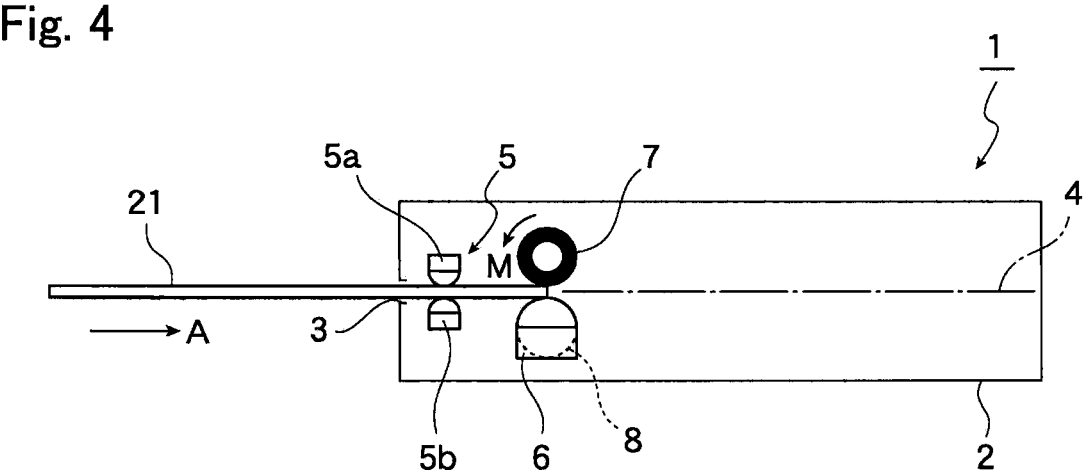
[FIG. 4]

In other words, as shown in FIG. 4, when a card 21 is inserted from the insertion port 3 into the casing 2 in the inserting direction (arrow "A" direction), the card sensor 5 detects an insertion of the card 21 on the basis of that the light from the light emitting element 5*a* to the light receiving element 5*b* is shielded by the card 21 and then, the sensor signal is outputted to the sensor sensing section 12. The sensor sensing section 12 having received the sensor signal notifies the CPU 11 that the card 21 has been inserted from the insertion port 3.

The CPU 11 commands the motor servo control section 17 to rotate the output shaft 9*a* of the motor 9 in a normal direction for taking the card 21 into the inside of the card reader 1 (right side in FIG. 4). The motor servo control section 17 having received this command turns "ON" the motor drive circuit 20 to rotate the output shaft 9*a* of the motor 9 at a constant rotational speed in the normal direction. As a result, the carrying roller 7 is rotated in the arrow "M" direction and the card 21 is carried in the inside of the card reader 1 along the carrying passage 4 at a constant speed (step "S1" of card processing program "PRG").

In this case, the motor rotational speed detecting section 16 detects an actual rotational speed of the output shaft 9*a* of the motor 9 in real time based on an encoder signal from the encoder 10 and outputs the actual rotational speed to the motor servo control section 17. The motor servo control section 17 having received this actual rotational speed appropriately increases or decreases an instruction so that, in a case that a rotational speed to the motor drive circuit 20 is higher than a target speed, a drive force of the motor is reduced and, in a case that the rotational speed is lower than the target speed, the drive force of the motor is increased. As a result, the carrying roller 7 is rotated at a constant rotational speed and thus the card 21 is carried at a constant speed.

Further, when the card 21 is taken into the inside of the card reader 1 (right side in FIG. 4), the medium information reading control section in the CPU 11 executes processing so as to control that, when the card 21 is carried by a pair of the carrying roller 7 and the pressing roller 8 in the inserting direction (arrow "M" direction in FIG. 1(*a*)), magnetic information recorded in the card 21 (medium information) is read by the magnetic head 6 and is stored and held in the memory 18. Specifically, in this embodiment, the magnetic head 6 starts reading of magnetic information recorded in the card 21 at the same time of the taking-in operation of the card 21. In other words, the magnetic head 6 reads (reproduces) the magnetic information which is recorded in the magnetic stripe of the card 21 by converting into an analog signal and the analog signal is outputted to the demodulation circuit 19. The demodulation circuit 19 having received the analog signal converts the analog signal into a digital signal, which is outputted to the decoding processing section 13. The decoding processing section 13 having received the digital signal converts the digital signal into character information to decode the magnetic information recorded in the card 21 based on the character information.

Figure 5:
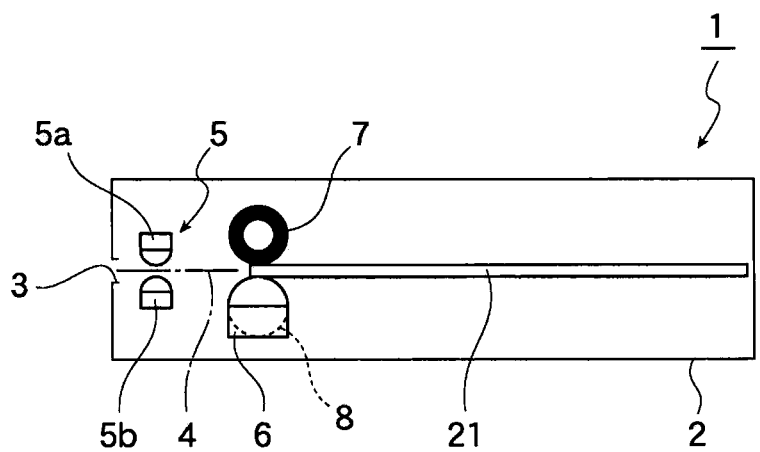
[FIG. 5]

The taking-in operation of the card 21 and the reading of the magnetic information are executed as described above and, when the card 21 is reached to a taking-in completed position (rearmost position in the inside of the casing 2) as shown in FIG. 5, the taking-in operation of the card 21 is completed and the reading of the magnetic information in the card 21 is completed (step "S2" of the card processing program "PRG"). Then, the CPU 11 in the card reader 1 stores and holds the magnetic information in the memory 18 (step "S3" of the card processing program "PRG").

After that, the ejection capability determining section in the CPU 11 executes a processing for determining whether the card 21 is capable of being ejected or not by carrying the card 21 by a pair of the carrying roller 7 and the pressing roller 8 in the ejecting direction (arrow "N" direction in FIG. 1(a)). Specifically, in this embodiment, the CPU 11 determines whether the card 21 is capable of being ejected or not by trying an ejecting operation of the card 21 as described below for confirming that a trick 27 for hindering ejection of the card 21 is not attached to the card reader 1 (step "S4" of the card processing program "PRG"). The trick 27 is provided with a structure which does not hinder the taking-in operation of the card 21 but hinders the ejecting operation of the card 21.

Figure 6:
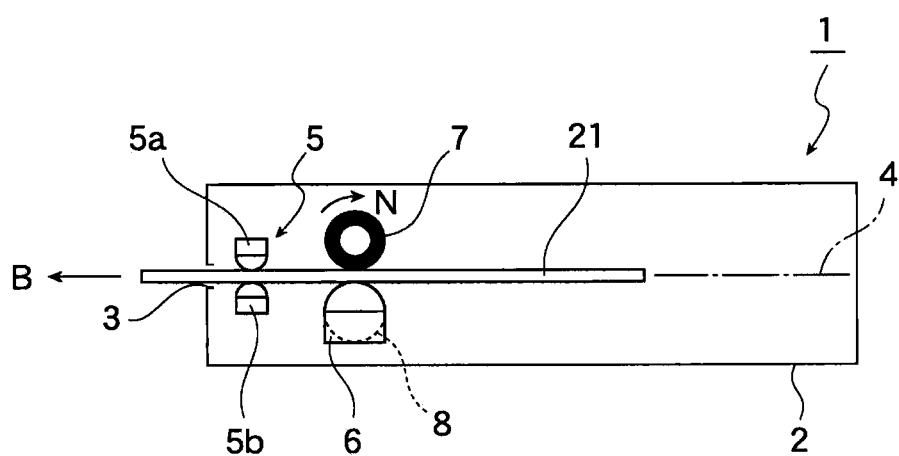
[FIG. 6]

First, the CPU 11 commands the motor servo control section 17 to rotate the output shaft 9a of the motor 9 in a reverse direction. The motor servo control section 17 receives this command and turns the motor drive circuit 20 "ON" to rotate the output shaft 9a of the motor 9 at a constant rotational speed in the reverse direction. As a result, as shown in FIG. 6, the carrying roller 7 is rotated in the arrow "N" direction and the card 21 is carried along the carrying passage 4 at a constant speed in a direction in which the card 21 is ejected from the card reader 1 (arrow "B" direction).

Next, the CPU 11 (the ejection capability determining section) executes the ejection capability determining processing and, when it is determined that the card 21 is capable of being ejected, the magnetic information (medium information) which is held in the memory 18 is processed so as to output to the host device 23. Specifically, in this embodiment, the CPU 11 determines whether the card 21 is passed the card sensor 5 or not based on a sensor signal (light shielding/light receiving) from the card sensor 5 (step "S5" of the card processing program "PRG"). Then, at a time point when the card 21 is passed the card sensor 5, the CPU 11 starts to measure an output period of a magnetic information reading signal which is outputted from the magnetic head 6 (step "S6" of the card processing program "PRG"). The CPU 11 repeatedly checks whether the magnetic information reading signal is outputted or not at each predetermined time interval until a predetermined output period has passed after the measurement is started (steps "S7" and "S8" of the card processing program "PRG").

Figure 8:
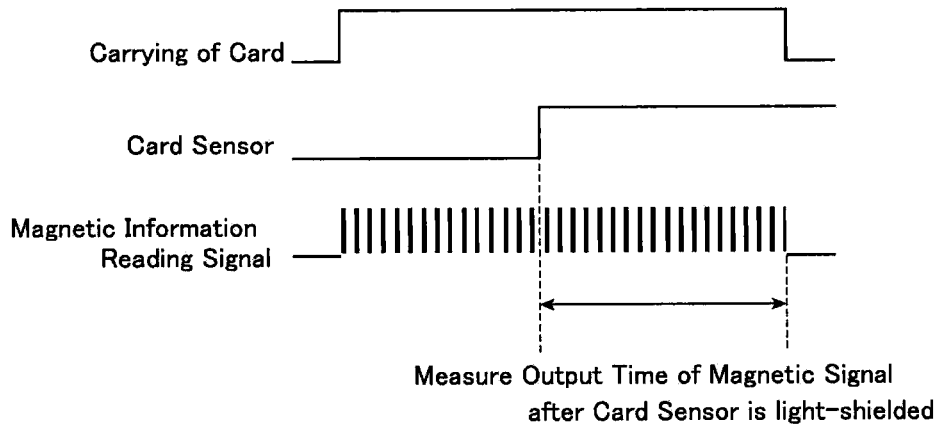
[FIG. 8]

Then, as shown in FIG. 8, in a case that the magnetic information reading signal is continuously outputted until the predetermined output period has passed, the CPU 11 determines that the card 21 is capable of being ejected and a trick 27 is not attached to the card reader 1 (step "S9" of the card processing program "PRG").

Next, in order to avoid a trouble that the card 21 is pulled out from the card reader 1 by a user during execution of a card transaction, the CPU 11 performs a retaking-in operation of the card 21 (step "S9" of the card processing program "PRG"). In other words, the CPU 11 commands the motor servo control section 17 so as to rotate the output shaft 9a of the motor 9 in the normal direction. The motor servo control section 17 receives this command and turns the motor drive circuit 20 "ON" to rotate the output shaft 9a of the motor 9 at a constant rotational speed in the normal direction. As a result, the carrying roller 7 is rotated in the arrow "M" direction and the card 21 is carried in the card reader 1 along the carrying passage 4 at the constant rotational speed.

Next, at the time that the retaking-in operation of the card 21 has been completed, the CPU 11 of the card reader 1 notifies the host device 23 that the taking-in operation of the card 21 has been completed normally and transmits magnetic information held in the memory 18 to the host device 23 depending on a magnetic information transmitting command from the host device 23 (step "S10" of the card processing program "PRG").

When the magnetic information is transmitted to the host device 23 as described above, a normal processing is executed between the host device 23 and the card reader 1. For example, the host device 23 commands a user to input his/her personal identification number and the user operates a personal identification number input device 26 to input the personal identification number. Then, the host device 23 performs a procedure for collating the personal identification number through communication with the host computer 25.

Figure 7:
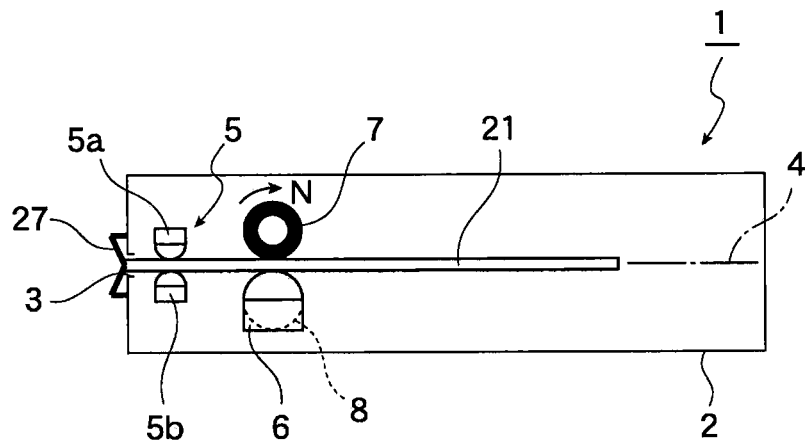
[FIG. 7]
Figure 9:
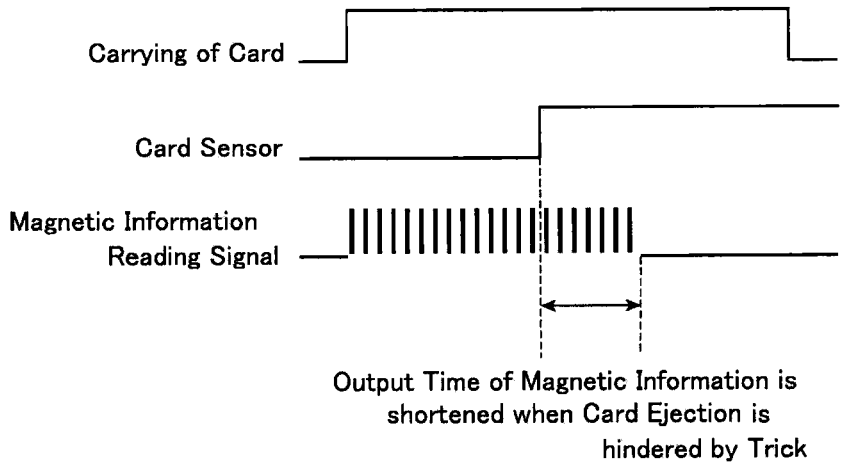
[FIG. 9]

On the other hand, the CPU 11 (ejection capability determining section) executes the ejection capability determining processing and, when it is determined that the card 21 is unable to be ejected, the magnetic information (medium information) held in the memory 18 is processed as a discard. Specifically, in this embodiment, when an output of the magnetic information reading signal is stopped before the predetermined output period has passed as shown in FIG. 9 ("NO" in the step "S7"), the CPU 11 determines that the card 21 is unable to be ejected and a trick 27 may be attached to the card reader 1 as shown in FIG. 7 (step "S11" of the card processing program "PRG").

Next, the CPU 11 discards the magnetic information which is held in the memory 18 without transmitting to the host device 23 (step "S11" of the card processing program "PRG"). In addition, the CPU 11 notifies the host device 23 of that its state is abnormal. In this embodiment, the CPU 11 notifies a jam error (error that the card 21 is unable to be carried through the carrying passage 4) to the host device 23 (step "S12" of the card processing program "PRG").

Therefore, the host device 23 does not proceed the next processing and thus, for example, the host device 23 does not command a user to input his/her personal identification number. Therefore, a situation is prevented that personal authentication information, for example, personal identification number or biological information such as a vein pattern of a finger or a palm, an iris or a fingerprint is peeped or stolen by a third person.

In this manner, the reading operation for the card 21 of the card reader 1 has been finished.

(Principal Effects of this Embodiment)

As discussed above, in this embodiment, the card reader 1 (CPU 11 of the card reader 1) is provided with the medium information reading control section, the ejection capability determining section and the medium information discard control section. Further, in the card reader 1, the magnetic information which is recorded in the card 21 is not outputted to the host device 23 unless it is confirmed that the card 21 is capable of being ejected. Therefore, in a case that the card 21 is unable to be ejected, the magnetic information is not outputted and thus illegal use of a medium by a criminal is prevented.

Specifically, in the card reader 1, a normal processing including communication with the host device 23 is executed in a normal state where a jam error is not occurred by a trick 27. Further, even at an abnormal time when a jam error is occurred by a trick 27, unless it is not confirmed that the card 21 is capable of being ejected from the card reader 1, information recorded in the card 21 is not outputted to the host device 23. Therefore, since information is not outputted when the card 21 is unable to be ejected, a processing of the host device 23 does not proceed to a requirement for inputting a personal identification number and thus, a situation is prevented that personal authentication information, for example, a personal identification number or biological information such as a vein pattern of a finger or a palm, an iris or a fingerprint is peeped or stolen by a third person. Therefore, even when a card 21 has been stolen, since personal authentication information such as a personal identification number is not stolen, illegal use of the card 21 by a criminal is prevented beforehand. Further, there is no risk of peeping personal authentication information such as a personal identification number and thus security is enhanced in comparison with a conventional case.

In addition, as described above, the program for the card reader 1 is required to be changed but the program for the host device 23 is not required to be changed. Therefore, the program can be changed at a low cost.

Further, the card reader 1 which is operated as described above has an effect that the card reader 1 will be excluded from a target object of a criminal act and thus an act itself of stealing a card 21 can be restrained.

In addition, different from the prior art 1 in which a card 21 is locked by a lock tooth at an abnormal time (ejection of a card is hindered), the card 21 is not damaged and thus, when a card 21 is not stolen by a criminal, a reissue cost of the card 21 is not required. Further, in comparison with the prior art 1 which is provided with a pull-out prevention lock mechanism, increasing of the number of part items and complicating of the structure are avoided and thus a manufacturing cost of the card reader 1 can be restrained. In addition, different from the prior art 1, in addition to that a hardware such as a pull-out prevention lock mechanism is not required to be assembled into the inside of the card reader 1, since reading of magnetic information recorded in a card 21 has been completed at the first taking-in operation of the card 21, at least an embodiment of the present invention can be applied to a small card reader 1 whose inside space is small.

Further, since a magnetic information reading signal which is outputted from the magnetic head 6 is utilized for confirming that a trick 27 is not attached to the card reader 1, an erroneous determination based on slippage of the carrying roller 7 can be avoided. In other words, for example, it is conceivable that an encoder signal outputted from the encoder 10 is utilized to confirm that a trick 27 is not attached to the card reader 1. However, the encoder signal does not correspond to movement of a card 21 when the carrying roller 7 slips on the card 21 due to some reason. As a result, it may be erroneously determined that the card 21 is ejected normally even when the card 21 has been stopped actually. On the other hand, the magnetic reading signal which is outputted from the magnetic head 6 is always correspondent to movement of the card 21 regardless of slippage of the carrying roller 7. Therefore, it can be correctly determined whether or not the card 21 is ejected normally and, as a result, it can be correctly determined whether or not a trick 27 is attached to the card reader 1.

In addition, in order to measure an output period of the magnetic information reading signal, a measurement start time is set at a time when an end face of the card begins to pass through the card sensor 5 and thus measurement accuracy can be enhanced. In other words, for example, it is conceivable that a measurement start time is set at a time when an end face of the card begins to pass through the magnetic head 6 in order to measure an output period of a magnetic information reading signal. However, in this case, since a measuring distance is long, an error amount is increased inevitably. On the other hand, when a measurement start time is set at a time when an end face of the card begins to pass through the card sensor 5, a measuring distance is shortened and thus an error amount is reduced and a measurement accuracy can be enhanced.

[Second Embodiment of the Present Invention]

Figure 10:
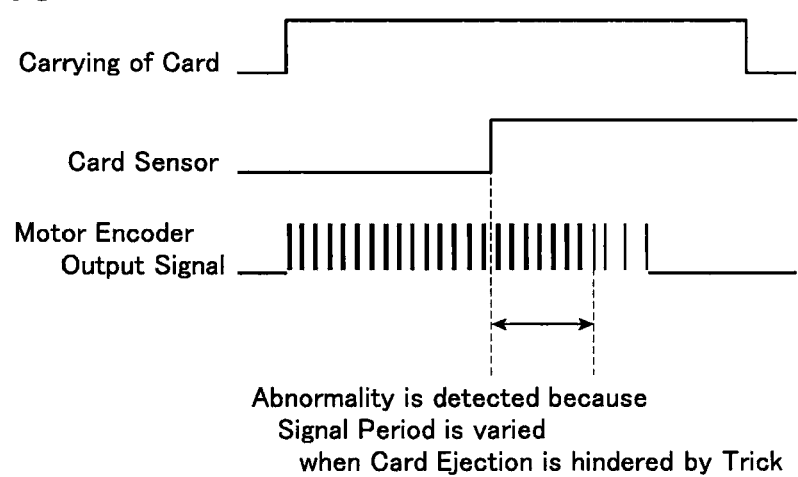
[FIG. 10]

A second embodiment of the present invention is shown in FIG. 10.

In the first embodiment described above, in order to confirm that a trick 27 is not attached to the card reader 1, a magnetic information reading signal which is outputted from the magnetic head 6 is utilized for avoiding an erroneous determination due to slippage of the carrying roller 7. However, in a case that a countermeasure for preventing slippage of the carrying roller 7 is adopted, for example, in a case that a friction coefficient of the carrying roller 7 is high and a drive force of the motor 9 is large, an encoder signal which is outputted from the encoder 10 may be utilized instead of a magnetic information reading signal which is outputted from the magnetic head 6. Next, this type of card reader 1 will be described below as a second embodiment.

In other words, in the second embodiment, in order to confirm that a trick 27 is not attached to the card reader 1, a variation of a period of an encoder signal which is outputted from the encoder 10 is utilized. When a period of the encoder signal is constant until a predetermined output period has passed, it is determined that the card 21 is capable of being ejected and a trick 27 is not attached to the card reader 1. On the other hand, as shown in FIG. 10, when a period of the encoder signal is deviated from a period which is a control target before a predetermined output period has passed, it is determined that the card 21 is unable to be ejected and a trick 27 may be attached to the card reader 1. Other operational procedures, the structure of the card reader 1 and the like are similar to the first embodiment described above.

As described above, in the second embodiment, a magnetic information reading signal which is outputted from the magnetic head 6 is not required to be utilized and thus the second embodiment may be applied to an IC card which is provided with no magnetic stripe. Specifically, the second embodiment may be applied to a contact type IC card in which reading and writing of information are performed by contacting IC terminals disposed on the surface of the IC card with IC contact points, or may be applied to a non-contact type IC card in which reading and writing of information are performed through radio communication in a non-contact state.

[Other Embodiments of the Present Invention]

In the first and the second embodiments described above, an optical type card sensor 5 is incorporated into the card reader 1 but another type other than the optical type card sensor, for example, a mechanical type card sensor 5 which detects a width of a card 21 is used instead of the optical type card sensor or together with the optical type card sensor.

Further, in the first and the second embodiments described above, the card reader 1 is provided with the carrying roller 7 but the card reader 1 may be provided with a carrying mechanism other than the carrying roller 7, for example, a carrying mechanism using a belt is used instead of using a carrying roller or together with a carrying roller.

Further, in the first and the second embodiments described above, the card reader 1 uses the CPU 11 as a control section but a control section other than the CPU 11, for example, a host device which directly controls the card sensor 5 and the motor 9 of the card reader 1 may be used instead of using the CPU 11.

In addition, in the first and the second embodiments described above, at least an embodiment the present invention is applied to a small card reader 1 which is structured of a pair of the carrying roller 7 and the pressing roller 8. However, the present invention may be similarly applied to a card reader 1 having a normal size in which plural pairs of carrying rollers are disposed in a carrying passage.

In addition, in the first and the second embodiments described above, a card 21 is used as a medium and the card reader 1 is used as a medium processing device. However, the present invention may be similarly applied to a device which processes a medium other than a card 21, for example, a bankbook, a check or the like which is used in a banking institution or the like.

The present invention may be widely applied to various apparatuses and equipments including, but not limited to, an ATM apparatus (automated teller machine), a CD machine (cash dispenser), a vending machine and a ticket vendor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A medium processing device comprising:
   a carrying mechanism for carrying a medium in an inserting direction and an ejecting direction;
   a medium information reading part for reading medium information which is recorded in the medium;
   a memory for storing the medium information which is read by the medium information reading part; and
   a control section for controlling the carrying mechanism, the medium information reading part and the memory;
   wherein the control section comprises:
   a medium information reading control section which controls so that, when the medium is carried in the inserting direction by the carrying mechanism, the medium information that is recorded in the medium is read by the medium information reading part to store and hold in the memory;
   an ejection capability determining section which controls so that the medium is carried in the ejecting direction by the carrying mechanism to determine whether the medium is capable of being ejected or not by detecting the presence or absence of a medium information reading signal outputted from the medium information reading part or by determining a driving condition based on a signal from an encoder which is attached to a motor; and
   a medium information discard control section which controls so that, when the ejection capability determining section has determined that the medium is unable to be ejected, the medium information which is held in the memory is discarded;
   wherein the ejection capability determining section confirms that a trick for hindering ejection of the medium is attached or not; and
   wherein the control section controls so that, when the ejection capability determining section has determined that the medium is capable of being ejected, in other words, it is confirmed that a trick for hindering ejection of the medium is not attached, the medium is carried in the inserting direction again by the carrying mechanism for preventing the medium from being pulled out and the medium information which has been held in the memory is outputted to a host device.

2. The medium processing device according to claim 1, wherein
   the medium is a card having a magnetic stripe in which magnetic information is recorded,
   the medium information reading part is a magnetic head, and
   the control section measures an output of a magnetic information reading signal which is outputted from the magnetic head when the card is carried in the ejecting direction by the carrying mechanism and the control section determines whether the card is capable of being ejected or not on a basis of whether the magnetic information reading signal is outputted or not.

3. The medium processing device according to claim 2, further comprising a sensor for detecting the card, the sensor being disposed between an insertion port into which the card is inserted and the magnetic head,
   wherein when the card is carried in the ejecting direction by the carrying mechanism, measurement of the output of the magnetic information reading signal which is outputted from the magnetic head is started at a time when the card is passed through the sensor.

4. A medium processing method which is applied to a medium processing device having a carrying mechanism for carrying a medium in an inserting direction and an ejecting direction, a medium information reading part for reading medium information which is recorded in the medium, and a memory for storing the medium information which is read by the medium information reading part; the medium processing method comprising:
   a medium information reading control step which is controlled so that, when the medium is carried in the inserting direction by the carrying mechanism, medium information recorded in the medium is read by the medium information reading part and is stored and held in the memory;
   an ejection capability determining step which determines, by carrying the medium in the ejecting direction by the carrying mechanism, whether the medium is capable of being ejected or not by detecting the presence or absence a medium information reading signal outputted from the medium information reading part or by determining a driving condition based on a signal from an encoder which is attached to a motor;
   a medium information discard step which is controlled so that, when the ejection capability determining step has determined that the medium is unable to be ejected, the medium information which has been held in the memory is discarded; and
   a medium information outputting step which is controlled so that, when the ejection capability determining step has determined that the medium is capable of being ejected, the medium information which has been held in the memory is outputted to a host device;
   wherein the ejection capability determining step confirms that a trick for hindering ejection of the medium is attached or not; and
   wherein, when the ejection capability determining step determines that the medium is capable of being ejected, in other words, it is confirmed that a trick for hindering ejection of the medium is not attached, the medium is carried in the inserting direction again by the carrying mechanism for preventing the medium from being pulled out and the medium information which has been held in the memory is outputted to a host device.

5. The medium processing method according to claim 4, wherein when the ejection capability determining step has determined that the medium is capable of being ejected, the medium is carried in the inserting direction by the carrying mechanism for preventing the medium from being pulled out.

6. The medium processing method according to claim 5, wherein after the medium information which has been held in the memory is outputted to the host device in the medium information outputting step, the medium processing device starts a normal processing with the host device.

7. The medium processing method according to claim 6, wherein the normal processing which is performed between the medium processing device and the host device includes a procedure in which a personal identification is collated by reading the personal identification information recorded on the medium.

8. The medium processing method according to claim 4, wherein the medium is a card having a magnetic stripe in which magnetic information is recorded, the medium information reading part is a magnetic head, and the medium processing method further comprises measuring an output of a magnetic information reading signal which is outputted from the magnetic head when the card is carried in the ejecting direction by the carrying mechanism and the control section determines whether the card is capable of being ejected or not on a basis of whether the magnetic information reading signal is outputted or not.

9. The medium processing method according to claim 8, the medium processing device further comprises a sensor for detecting the card, the sensor being disposed between an insertion port into which the card is inserted and the magnetic head, wherein when the card is carried in the ejecting direction by the carrying mechanism, measurement of the output of the magnetic information reading signal which is outputted from the magnetic head is started at a time when the card is passed through the sensor.

* * * * *